(12) United States Patent
Cohen

(10) Patent No.: US 11,138,879 B2
(45) Date of Patent: Oct. 5, 2021

(54) TEMPORAL BASED ROAD RULE CHANGES

(71) Applicant: Toyota Research Institute, Inc., Los Altos, CA (US)

(72) Inventor: Schuyler H. Cohen, Ann Arbor, MI (US)

(73) Assignee: Toyota Research Institute, Inc., Los Altos, CA (US)

(\*) Notice: Subject to any disclaimer, the term of this patent is extended or adjusted under 35 U.S.C. 154(b) by 145 days.

(21) Appl. No.: 16/185,628

(22) Filed: Nov. 9, 2018

(65) Prior Publication Data

US 2020/0152059 A1  May 14, 2020

(51) Int. Cl.
| | | |
|---|---|---|
| *G08G 1/0967* | (2006.01) | |
| *G01C 21/36* | (2006.01) | |
| *G08G 1/0962* | (2006.01) | |
| *H04W 4/44* | (2018.01) | |

(Continued)

(52) U.S. Cl.
CPC ......... *G08G 1/096725* (2013.01); *B60Q 9/00* (2013.01); *G01C 21/3626* (2013.01); *G01C 21/3691* (2013.01); *G05D 1/0276* (2013.01); *G08G 1/09623* (2013.01); *G08G 1/096775* (2013.01); *G08G 1/096791* (2013.01); *H04W 4/44* (2018.02)

(58) Field of Classification Search
CPC ......... G08G 1/096725; G08G 1/09623; G08G 1/096775; G08G 1/096791; G01C 21/3626; G01C 21/3691; H04W 4/44; B60Q 9/00; G05D 1/0276

USPC .......................................................... 701/24
See application file for complete search history.

(56) References Cited

U.S. PATENT DOCUMENTS

| | | | | |
|---|---|---|---|---|
| 2008/0094250 | A1* | 4/2008 | Myr | G08G 1/04 340/909 |
| 2012/0249341 | A1* | 10/2012 | Brown | G08G 1/095 340/902 |

(Continued)

OTHER PUBLICATIONS

Sanuesa, J. et al., "Sensing Traffic Density Combining V2V and V2I Wireless Communications," Sensors 2015, 15, 31794-31810, MDPI Journal (Dec. 16, 2015).

(Continued)

*Primary Examiner* — Jonathan M Dager
*Assistant Examiner* — Jean W Charleston
(74) *Attorney, Agent, or Firm* — Christopher G. Darrow; Darrow Mustafa PC

(57) ABSTRACT

Systems and methods are provided for operating a vehicle based on at least one updated road rule. The system may include one or more sensors or communication devices. The one or more sensors or communication devices may be configured to acquire data indicative of at least one temporal change in a road rule. A processor is provided operatively connected to the one or more communication devices. The processor is configured to update a standard road rule to an updated road rule based on the temporal change in the road rule, determine a change in a driving maneuver permitted for the vehicle based on the updated road rule, and cause the vehicle to implement the change in the driving maneuver. The processor may also be configured to send a command to update a road map display of the vehicle to graphically illustrate the temporal change in the road rule.

16 Claims, 9 Drawing Sheets

(51) Int. Cl.
B60Q 9/00 (2006.01)
G05D 1/02 (2020.01)

(56) References Cited

U.S. PATENT DOCUMENTS

| | | | | |
|---|---|---|---|---|
| 2016/0171884 | A1* | 6/2016 | Chen | G01C 7/04 |
| | | | | 701/117 |
| 2016/0180707 | A1* | 6/2016 | MacNeille | B60W 40/04 |
| | | | | 701/117 |
| 2017/0003134 | A1* | 1/2017 | Kim | G08G 1/09626 |
| 2017/0008521 | A1* | 1/2017 | Braunstein | G08G 1/167 |
| 2017/0024621 | A1* | 1/2017 | Thompson | H04W 4/46 |
| 2017/0132855 | A1 | 5/2017 | Kim et al. | |
| 2018/0365908 | A1* | 12/2018 | Liu | G05D 1/005 |
| 2019/0088148 | A1* | 3/2019 | Jacobus | B60W 30/09 |
| 2019/0138024 | A1* | 5/2019 | Liang | G06K 9/6273 |
| 2020/0128383 | A1* | 4/2020 | Maier | H04W 4/12 |

OTHER PUBLICATIONS

Filippi, A. et al., "Ready to roll: Why 802.11p beats LTE and 5G for V2x," a white paper by NXP Semiconductors, Cohda Wireless, and Siemens (https://www.siemens.com/content/dam/webassetpool/mam/tag-siemens-com/smdb/mobility/road/connected-mobility-solutions/documents/its-g5-ready-to-roll-en.pdf) 14 pages, accessed Mar. 1, 2018.

* cited by examiner

TEMPORAL BASED ROAD RULE CHANGES

TECHNICAL FIELD

The present disclosure generally relates to road rule changes, and more particularly, to providing map updates and controlling vehicle maneuvers responsive to temporal based road rule changes.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Many populated areas include roads with reversible traffic lanes. A reversible traffic lane, or reversible lane, is a lane in which traffic alternates in a direction of travel due to traffic congestion or weather related events. For example, reversible traffic lanes work well in areas where traffic flow may be heavily imbalanced for a short period of time. The directional flow of traffic in a reversible traffic lane may be for a predetermined period of time or be determined based on the timing of certain events. The use of reversible traffic lanes may be periodic, based on a known schedule, or temporal, based on one or more triggering event. Reversible traffic lanes may be useful where there is highly directional congestion: based on a time of day; in a construction/work zone; after a major traffic accident; during severe weather events; in tunnels or on bridges; and/or adjacent special event centers.

Some vehicles include an operational mode in which a computing system is used to navigate and/or autonomously maneuver the vehicle along a travel route with minimal or no input from a human driver. While such vehicles are provided with numerous sensor systems and navigation tools, the use of reversible traffic lanes may not be easily or accurately detected, affecting the determination of how to navigate and/or maneuver the vehicle through the surrounding environment.

Accordingly, it would be desirable to provide an improved techniques for navigating a vehicle in routes containing reversible traffic lanes.

SUMMARY

This section provides a general summary of the disclosure, and is not a comprehensive disclosure of its full scope or all of its features.

In various aspects, the present teachings provide a method of updating a road map display of a vehicle with at least one change of a road rule. The method may include using one or more sensors or communication devices to acquire data indicative of at least one temporal change in a road rule. Using the acquired data, the method can include determining a geographical location affected by the temporal change in the road rule. Based on at least one of a current location of the vehicle and a current route guidance plan, the method may determine that the vehicle will traverse the geographical location affected by the temporal change in the road rule. The method includes sending a command to update the road map display of the vehicle to graphically illustrate the temporal change in the road rule.

In other aspects, the present teachings provide a method of operating an autonomous vehicle. The method may include using one or more sensors or communication devices to acquire data indicative of at least one temporal change in a road rule. Using the acquired data, the method can include determining a geographical location affected by the temporal change in the road rule. Based on at least one of a current location of the vehicle and a current route guidance plan, the method may determine that the vehicle will traverse the geographical location affected by the temporal change in the road rule. The method includes updating a standard road rule to an updated road rule based on the temporal change in the road rule, and determining a change in a driving maneuver permitted for the vehicle based on the updated road rule. The method further includes causing the vehicle to implement the change in the driving maneuver. In one aspect, the change in the driving maneuver includes directing the vehicle to switch from a current travel lane to a reversible traffic lane.

In still other aspects, the present teachings provide a system for operating a vehicle based on at least one updated road rule. The system may include one or more sensors or communication devices. The one or more sensors or communication devices may be configured to acquire data indicative of at least one temporal change in a road rule. A processor is provided operatively connected to the one or more communication devices. The processor is configured to update a standard road rule to an updated road rule based on the temporal change in the road rule, determine a change in a driving maneuver permitted for the vehicle based on the updated road rule, and cause the vehicle to implement the change in the driving maneuver. The processor may also be configured to send a command to update a road map display of the vehicle to graphically illustrate the temporal change in the road rule.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
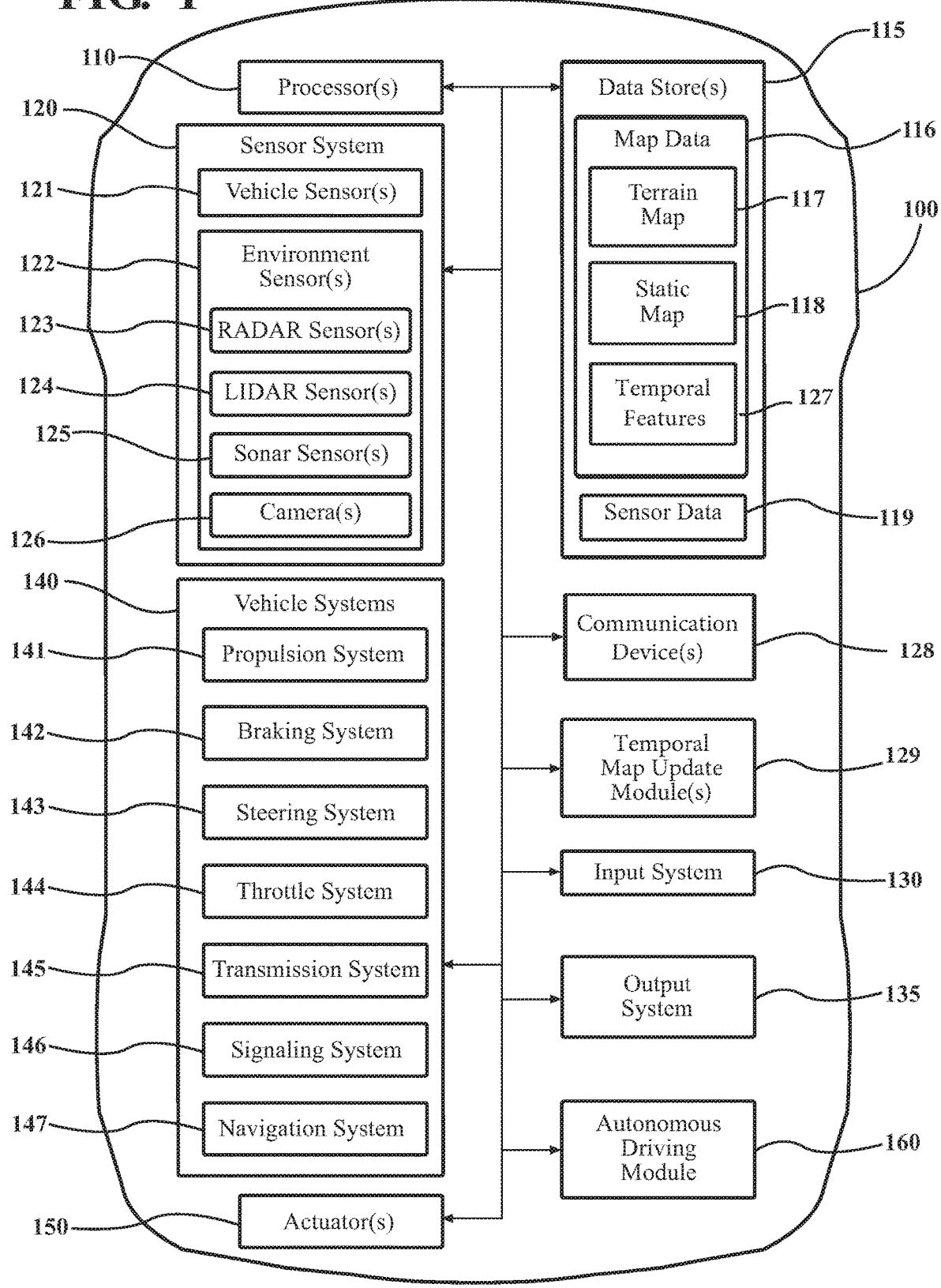
FIG. 1 is a schematic illustration of a vehicle having various systems, modules, devices, sensors, and the like, useful with the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides updated roads maps for a vehicle and implements updated vehicle driving maneuvers that reflect changes in certain road rules. The changes in certain road rules may include time-based or temporal road rules, such as the use of reversible traffic lanes (or lane restrictions) or parking rules. The temporal road rules may also encompass a change in a speed limit. In various aspects, the changes in the road rules may be based on changes in traffic volume, weather related events, emergency situations, and the like. Reversible traffic lanes are beneficial in that they can easily add capacity to a roadway and decrease vehicle congestion without the additional construction costs associated with building more lanes and/or roads. In this regard, reversible traffic lanes may change direction at specified times of the day, when traffic volumes exceed certain limits, or when certain temporal events take place. While predetermined and predictable changes can generally be planned for in advance, such as the use of a high-occupancy vehicle (HOV) lane during specified peak travel times, other traffic volume changes and temporal events resulting in a change in one or more road rule, such as traffic for a special event, may not be predictable. Similarly, while certain parking rules can be planned for in advance, such as "no parking" at certain times of the day, or parking limited to a certain amount of time, other parking rule changes based on weather events, such as no parking during a snow emergency, may not be predictable. Predetermined, periodic, and predictable changes can be programmed into a navigation system or otherwise learned. However, temporal and non-periodic changes cannot be as easily programmed or learned, especially with an autonomous vehicle having minimal or no input from a user or occupant.

The present technology provides systems and methods for the monitoring of various changes in road rules, in particular for temporal changes, that may be difficult for a vehicle, in particular an autonomous vehicle, to determine with minimal or no input from a human driver. The systems and methods acquire and process data, and may ultimately provide an updated navigational road map display for a user (e.g., human driver) to illustrate the changes in road rules, and/or implement updated vehicle driving maneuvers such that the vehicle is and remains in compliance with the changes in road rules. The updated road map display may reflect real-time updates based on time sensitive information obtained from communication between vehicles or between vehicles and infrastructure, communication broadcasts, or the like. For example, the present technology is capable of providing an updated road map display, such as navigation road map, that accounts for various temporal (time-based) or time-sensitive changes in roadway rules in order to improve situational awareness about roadway configurations. In various aspects, the present technology does not need to perform a full map update (including terrain and static map portions) when there are periodic or temporary changes in rules. Rather, it may simply update the rules and/or changes on the map. and use it differently without a full map update every time. The road map display may be part of a vehicle system, such as a navigation system, or it may be located on a portable device, such as a tablet, phone, or other display controlled, used, or operated by a user or occupant of the vehicle.

Systems and methods are also provided for operating a vehicle based on at least one updated road rule. As will be discussed in more detail below, the systems may include one or more sensors or communication devices. The one or more sensors or communication devices may be configured to acquire data indicative of at least one temporal change in a road rule. The data may be received from various sources, including from governmental agencies, weather agencies, and trusted/authorized third parties. The data may be downloaded or transferred through a network, or may be broadcast or exchanged using various vehicular communication systems, or vehicle-to-everything (V2X) technology as will be described. Data transfers can be periodic, such as via scheduled downloads, internet updates, RSS feeds, and the like, or they can be non-periodic, in real-time when an event occurs that requires a change in at least one road rule. Data transfers can also be broadcast to vehicles using various beacon devices and related technologies. At least one processor is provided operatively connected to the one or more sensors and communication devices, as well as relevant vehicle systems and controls. The processor may be configured to process the data and update a standard road rule to an updated road rule based on the temporal change in the road rule, determine a change in a driving maneuver permitted for the vehicle based on the updated road rule, and cause the vehicle to implement the change in the driving maneuver. Still further, the processor may also be configured to send a command to update a navigation road map display of the vehicle to graphically illustrate the temporal change in the road rule and/or indicate any affects it may have with respect to a current vehicle route. The processor may also provide visual and/or audio notifications to a user or occupant of the vehicle, and in certain instances, the processor may also solicit input from a user or occupant in order to confirm or modify any changes in a route, proceed with the use of a driving maneuver, or proceed with respect to a parking decision.

FIG. 1 provides a vehicle 100 as an example environment within which the system and methods disclosed herein may operate. As used herein, "vehicle" means any form of motorized transport. In one or more implementations, the vehicle 100 can be an automobile. While aspects will be described herein with respect to automobiles, it will be understood that aspects are not limited to automobiles. In some implementations, the vehicle 100 may be a watercraft, an aircraft, an aerocar, or any other form of motorized transport.

In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user. In one or more aspects, the vehicle 100 can be a conventional vehicle that is configured to operate in only a manual mode.

In one or more aspects, the vehicle 100 is an autonomous vehicle. As used herein, an "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more aspects, the vehicle 100 is highly automated or completely automated. In one aspect, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include various elements, some of which are shown in FIG. 1. In some aspects, it will be understood that while various elements are shown as being located in the vehicle 100, they can be located external to the vehicle 100, or remote to the vehicle, such as being physically separated by large distances.

The vehicle 100 can include one or more processors 110. In one or more aspects, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more aspects, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more aspects, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more aspects, the map data 116 can include one or more static maps 118. The static map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static map(s) 118 can have location data, size data, dimension data, material data, and/or other data associated with it. The static map(s) 118 can include measurements, dimensions, distances, and/or information for one or more static obstacles. The static map(s) 118 can be high quality and/or highly detailed. The static map(s) 118 can be updated to reflect changes within a mapped area.

In one or more aspects, the map data 116 can include map features related to temporal road rules, referred to herein as temporal features 127. Temporal features 127 may include data and information pertinent to reflect changes in certain road rules, such as the use of reversible traffic lanes (or lane restrictions) or illustrate parking rules. Temporal features 127 can include or otherwise be paired with location data, time-stamp data, size data, dimension data, material data, and/or other data associated with temporal changes in road rules, temporal changes in parking rules, and the like. Temporal features 127 such as road openings/closures, lane usage changes, parking rule changes, time sensitive rules and rule changes, etc., may be illustrated in a navigational road map display located in the vehicle 100 for visual review by a human driver of vehicle occupant.

In one or more aspects, the vehicle 100 may include a temporal map update module 129. The temporal map update module 129 may be configured to update the navigational road map display of the vehicle, or send an updated display to an auxiliary device, with various temporal features 127 and/or other map data 116. The temporal map update module 129 may be configured to periodically update the navigational road map display, or provide updates when data is acquired indicative of at least one temporal change in a road rule. The temporal map update module 129 may also be configured to save temporal features 127 in the one or more data stores 115. In certain aspects, in addition to updating the navigational road map display, the temporal map update module 129 may be configured to provide at least one of a visual or audible notification to a user or occupant of the vehicle 100 regarding an update made to the road map display based on the temporal change in the road rule, or to simply advise the user of the change in one or more road rules.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more aspects, the sensor data 119 can include information on one or more LIDAR sensors 124 or cameras 126 of the sensor system 120.

Figure 2:
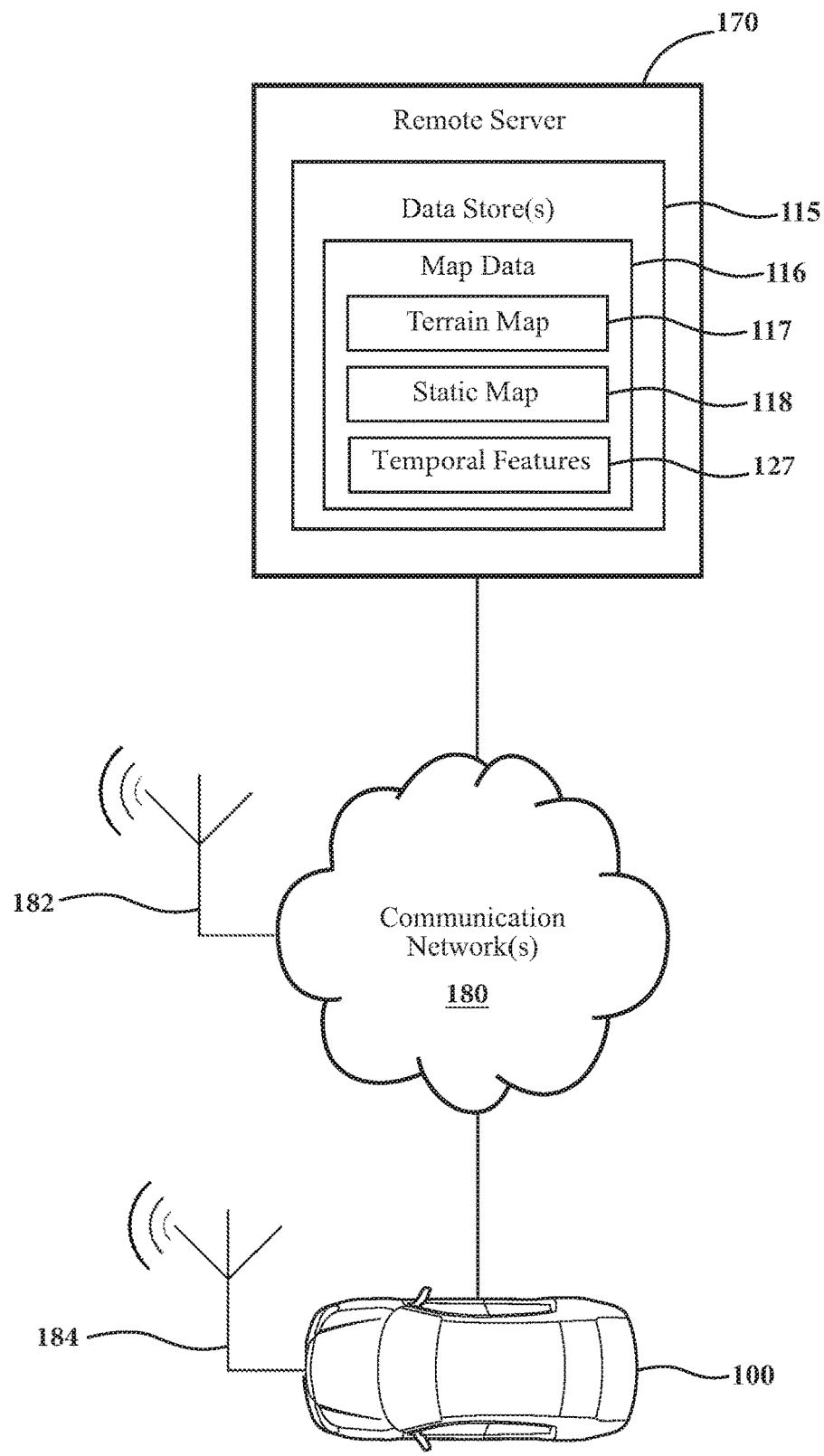
FIG. 2 is a schematic illustration of communication systems useful with the present technology and is an example of the vehicle communicatively linked to a remote server that includes map data.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100. For example, FIG. 2 shows one or more of the data stores 115 being located on a remote server 170. The remote server 170 can be communicatively linked to the vehicle 100 through one or more communication network(s) 180. In certain aspects, a transmitting/receiving device 182, 184 such as a transmitter, receiver, or the like may be in communication with the communication network(s) 180 or vehicle 100, respectively. The map data 116 and/or the sensor data 119 can be obtained by the vehicle 100 from any suitable source, including a sensor manufacturer, the vehicle manufacturer, and/or authorized/trusted third party, just to name a few possibilities.

In one or more aspects, the vehicle 100 may include one or more communication system including at least one communication module or communication device(s) 128. In various aspects, the communication device(s) 128 are configured to be able to work with wireless technology such as sending/receiving vehicle-to-everything (V2X) communication. V2X communication includes the transfer of data and/or information from a vehicle to any entity that may affect the vehicle, and vice-versa. Non-limiting examples of V2X communication available as of the time of filing of this application and useful for sharing data indicative of temporal changes in a road rule include vehicle-to-infrastructure (V2I), vehicle-to-vehicle (V2V), vehicle-to-pedestrian (V2P), vehicle-to-device (V2D), and vehicle-to-grid (V2G) communication. V2X communication is generally based on WLAN technology and works directly between vehicles that form a vehicular ad-hoc network as two V2X senders come within each other's range. V2X communication does not require any other infrastructure for vehicles to communicate, although it is envisioned that in certain aspects, other communication network(s) may be of value with the sharing of data and information. It should be understood that although the present technology may be explained with particular reference to V2X communication, it is also applicable with other standards and radio technologies that may be used in Europe, Asia, and other global locations. In certain aspects, the data or information may be broadcast from beacons (FIGS. 3-5) or the like, that may be located in areas adjacent the locations affected by the change in road rules. In construction zones, for example, barricades or construction barrels may include beacons or broadcast devices for communication. In still other aspects, data indicative of at least one temporal change in a road rule may be transferred using cellular technology, or can be uploaded/downloaded/transferred using any internet technology.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In aspects in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the aspects are not limited to the particular sensors described. The sensor system 120 can include one or more vehicle sensors 121. The vehicle sensor(s) 121 can detect, determine, and/or sense information about the vehicle 100 itself. In one or more aspects, the vehicle sensor(s) 121 can be configured to detect, and/or sense position and orientation changes of the vehicle 100, such as, for example, based on inertial acceleration. In one or more aspects, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and /or other suitable sensors. The vehicle sensor(s) 121 can be configured to detect, and/or sense one or more characteristics of the vehicle 100. In one or more aspects, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the aspects are not limited to the particular sensors described.

As an example, in one or more aspects, the sensor system 120 can include one or more radar sensors 123, one or more LIDAR sensors 124, one or more sonar sensors 125, and/or one or more cameras 126. In one or more aspects, the one or more cameras 126 can be high dynamic range (HDR) cameras or infrared (IR) cameras.

The vehicle 100 can include an input system 130. An "input system" includes any device, component, system, element or aspect or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the temporal map update module(s) 129, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the temporal map update module(s) 129, and/or the autonomous driving module(s) 160 may control some or all of these vehicle systems 140 and, thus, may be partially or fully autonomous.

The processor(s) 110, the temporal map update module(s) 129, and/or the autonomous driving module(s) 160 can be operatively connected to communicate with the various vehicle systems 140 and/or individual components thereof. For example, returning to FIG. 1, the processor(s) 110, the temporal map update module(s) 129, and/or the autonomous driving module(s) 160 can be in communication to send and/or receive information from the various vehicle systems 140 to control the movement, speed, maneuvering, heading, direction, etc. of the vehicle 100. The processor(s) 110, the temporal map update module(s) 129, and/or the autonomous driving module(s) 160 may control some or all of these vehicle systems 140.

The processor(s) 110, the temporal map update module(s) 129, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the temporal map update module(s) 129, and/or the autonomous driving module(s) 160 can control the direction and/or speed of the vehicle 100. The processor(s) 110, the temporal map update module(s) 129, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more aspects, one or more of the modules described herein can include artificial or computational intelligence elements, e.g., neural network, fuzzy logic or other machine learning algorithms. Further, in one or more aspects, one or more of the modules can be distributed among a plurality of the modules described herein. In one or more aspects, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more aspects, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110 , and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, switch between one or more travel lanes, merging into a travel lane, reversing, stopping, standing, directing the vehicle into a parking spot/area, and/or preventing the vehicle from entering or using a parking spot/area due to a temporal road rule, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

In various systems and methods of the present technology, temporal changes that may require a change in a road rule or parking regulation may be based on predictable traffic changes, or may be periodic in nature, such as daily rush hours or peak travel times, HOV lane usage, or weekly timed events such as religious services. In other aspects, certain commencement times may be known or predictable, while the end times may not be generally predictable, but not always specifically known. In still further aspects, such as during weather and emergency events, neither commencement nor end times may be known with any level of accuracy, and may in most instances require manual activation/control of the temporal rules. Thus, the beginning and end times for certain temporal road rules may vary and cannot accurately be programmed in a vehicle in advance. For example, in areas near special event centers (concert halls, stadiums, sport centers, religious centers, exhibit halls, and the like), it may be desirable to have reversible traffic lanes in areas adjacent to, surrounding, or otherwise leading to/from the special event center.

For lengthy events, however, it may not be necessary or desirable to have reversible traffic lanes or certain rules in effect for an entire duration of an event. For example, a football game beginning with a tailgate crowd and ending with overtime can lead to an extended, sometimes unpredictable period of time. Accordingly, the commencement and end times for certain temporal road rule changes may be determined and made by a governmental agency, such as a local municipality or county, or other authorized third party, at appropriate times based on real-time events, and then shared using the various communication techniques described herein, preferably using a broadcasting technology.

Thus, in various aspects, the road rules may be communicated to vehicles using V2X communication (or equivalent) with specific start times or a first time-stamp, and optionally an end time, or a second time-stamp. The communications may be time based or event based periodic broadcasts. The starting times for certain rules may be made known and provided in advance, for example, in a first communication. When the end time is not initially known or determined at a later time, a second communication can be transmitted, optionally with the second time-stamp, indicating an end of a temporal rule, where the temporal road rule then reverts back to a standard road rule. At an appropriate time, or after the vehicle acquires such additional data, in certain aspects, one or more of the vehicle systems may send a command to update the road map display of the vehicle to graphically illustrate a reversion to a standard road rule. This may also be accompanied by at least one of a verbal or visual notification to a user or occupant of the vehicle. Where the method includes controlling an operation of the vehicle, such as a driving maneuver, one or more of the vehicle systems can determine a follow-up change in a driving maneuver that may be required for the vehicle for compliance based on the reversion to the standard road rule. Such methods may then include causing the vehicle to implement the change in the driving maneuver.

As briefly discussed above, in aspects where the temporal road rule changes are related to weather or emergency events, including but not limited to severe weather evacuation routes; restrictions related to snow, excessive rain/flooding/mudslides; natural disasters; vehicle accidents; and/or traffic volumes exceeding predetermined limits or capacities (for example, in tunnels or on bridges) the temporal road rule changes may be sporadic, intermittent, and/or during more random time periods. Accordingly, the temporal road rules may need to be communicated to vehicles using V2X communication (or equivalent) on a repeated or periodic basis until the weather or emergency event has concluded. In certain aspects, the periodic basis may even be a continuous basis.

In certain aspects, the vehicle may be travelling in an area that is near a road that will be affected by a temporal road rule change, but the vehicle will not be traversing the area or specific road. Thus, there may not be a need to update the navigational road map display or otherwise prepare for the change in the road rule. In various aspects, the methods of the present technology include determining a geographical location affected by the temporal change in the road rule. The methods may then further include determining, based on at least one of a current location of the vehicle and a current route guidance plan, whether the vehicle will traverse the geographical location affected by the temporal change in the road rule. If it is certain or probable that the vehicle will be affected by the road rule change, the methods may then include sending a command to update the road map display of the vehicle to graphically illustrate the temporal change in the road rule, and/or proceeding to update a standard road rule to an updated road rule based on the temporal change in the road rule for use in controlling a driving maneuver. If it is certain or probable that the vehicle will be not at all be affected by the temporal road rule change, the systems and methods of the present technology may be programmed to not take any action.

In various aspects, the data indicative of at least one temporal change in road rule is encrypted for security purposes. In certain aspects, the present technology includes validating the data indicative of the temporal change in the road rule. Validation of the data may prevent against potential bad actors trying to inappropriately change road rules and/or influence the operation or control of a vehicle. Validation of the data may also be useful to ensure data integrity. For example, while there may not be malicious intent, there may be instances where the data (or a portion thereof) becomes corrupt. It is envisioned that the validation may be performed using at least one secondary resource. It should be understood that the secondary resource may not be needed to explicitly validate the rule itself, but may be helpful in validating what the rule would imply is still safe. For example, simply because the map indicates a lane is present and/or is available for use does not necessarily imply that the vehicle should use the lane if there is other information/data indicating that the lane should not otherwise be used. In various aspects, the secondary resource may include a camera sensor, or the like, and validating the data includes optically or otherwise detecting at least one of: a pavement marking, a dynamic lane use control signal, and a static sign confirming the temporal change in the road rule. In other aspects, the secondary resource may include a communication device, and validating the data includes receiving verification information from at least one of: a government agency, a weather agency, an authorized third party, and a neighboring vehicle confirming the temporal change in the road rule. The verification and/or validation can also occur by cross-checking data in a cloud based system. In still other aspects, there can be a data integrity metric, such as a checksum, or the like, to validate the data received is indeed the data that was sent.

In the event that the vehicle receives conflicting information concerning one or more temporal road rule, the methods may include some type of probabilistic framework for determining which information, if any, should be used. In various aspects, the source of the information may be trusted in a certain hierarchical order. For example, if it is determined that the vehicle has received conflicting information from both a governmental agency and a neighboring vehicle, the methods may provide more weight to the information/data obtained from the governmental agency. However, in another example, if the vehicle has also obtained information/data that conflicts with information obtained from a vehicle sensor, such as an on-board camera indicating a direction of traffic, the methods may provide more weight to the information obtained from the vehicle sensor. In various aspects, the probabilistic framework may include modeling, such as Bayesian data analysis methods.

As described above, the use of reversible traffic lanes may be controlled by one or more or a combination of operational controllers, such as dynamic lane use control signals, pavement markings, static signs, dynamic message signs, and various broadcasting devices such as beacons. Using a combination of these traffic control devices, motorists can be told which lanes are open or closed for their given direction of travel.

Dynamic lane use control signals are special overhead signals that permit or prohibit the use of specific lanes of a street or highway or that indicate the impending prohibition of their use. Lane-use control signals are distinguished by placement of special signal faces over a certain lane or lanes of the roadway and by their distinctive shapes and symbols. For urban roadways, these signals may be suspended over the lanes using wires, or they may be attached to traffic signal poles.

Figure 3A:
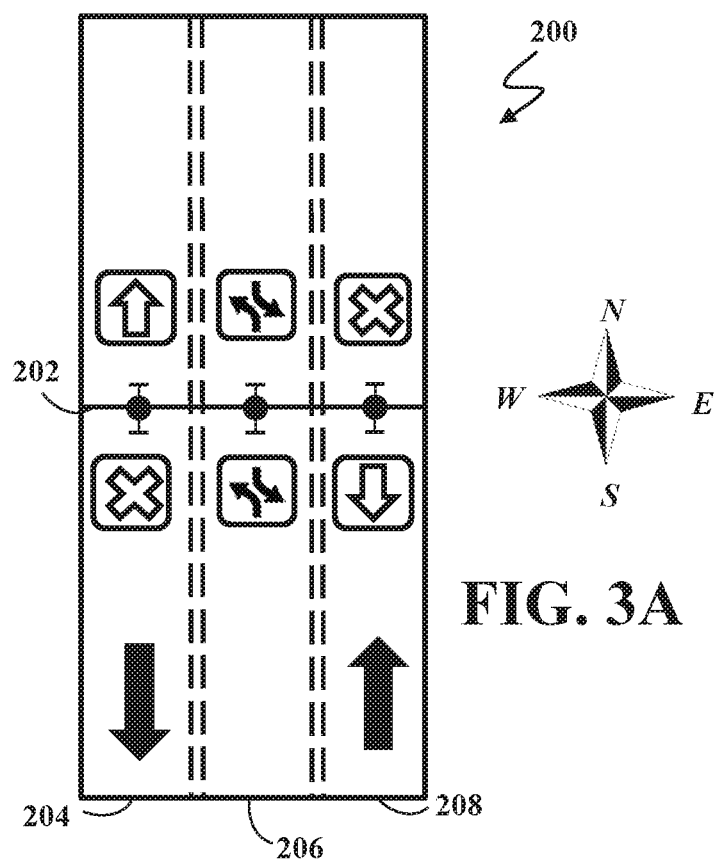
FIG. 3A is a schematic illustration of an exemplary three-lane roadway with a reversible traffic lane operable in a center turn lane mode.
Figure 3B:
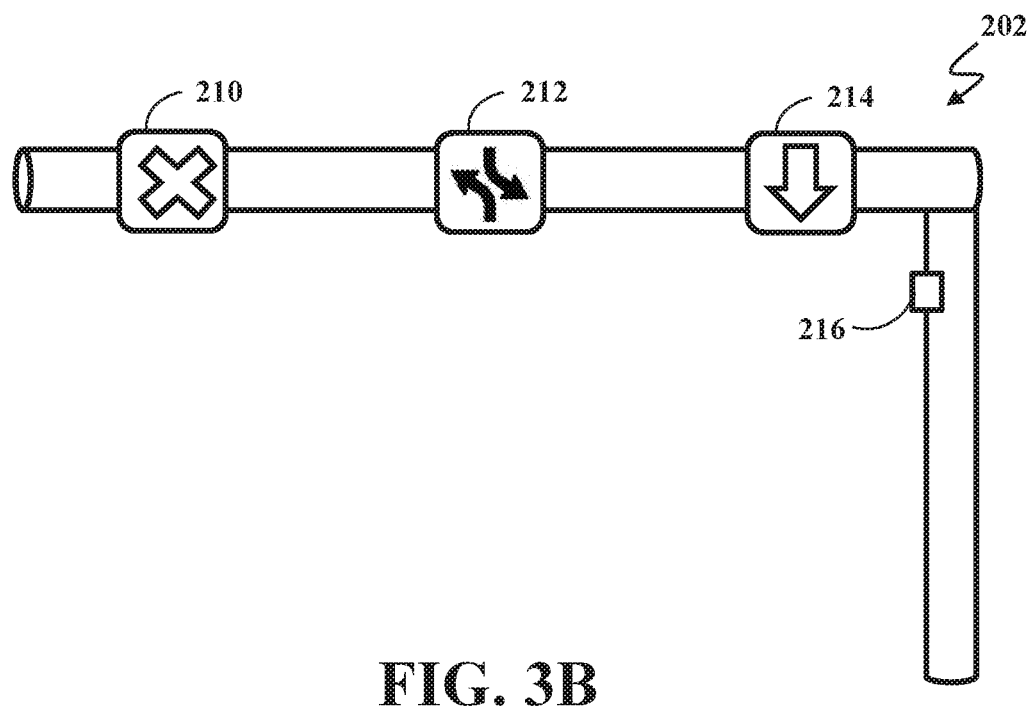
FIG. 3B is an exemplary set of dynamic lane use control signals (for both northbound and southbound traffic) representing the center turn lane mode of the three-lane roadway of FIG. 3A.

FIG. 3A is a schematic illustration of an exemplary three-lane roadway 200 with a southbound lane 204, a reversible traffic lane 206 currently operable in a center turn lane mode, and a northbound lane 208. FIG. 3B is an exemplary set of dynamic lane use control signals (for both northbound and southbound traffic) on a traffic pole 202, representing the direction of each traffic lane as well as the function/mode of the center turn lane mode of the three-lane roadway of FIG. 3A. As shown, the "X" on signal 210 indicates that lane is not intended for traffic in the current direction. The dual arrow on signal 212 represents that lane is intended for center turns only. The single arrow on signal 214 indicates that lane is currently intended for traffic in the current direction. As shown, the traffic pole may be provided with a communication device 216, such as a beacon, to provide/broadcast the information to vehicles indicative of the current operational modes.

Figure 4A:
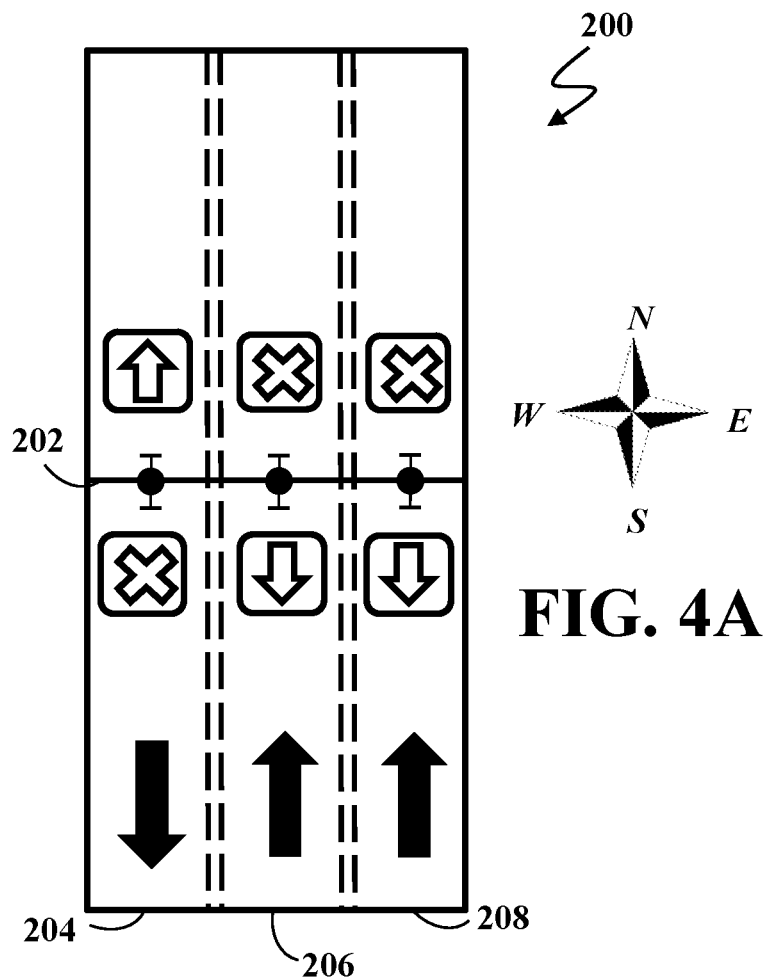
FIG. 4A is a schematic illustration of an exemplary three-lane roadway with a reversible traffic lane operable in a north-bound mode.
Figure 4B:
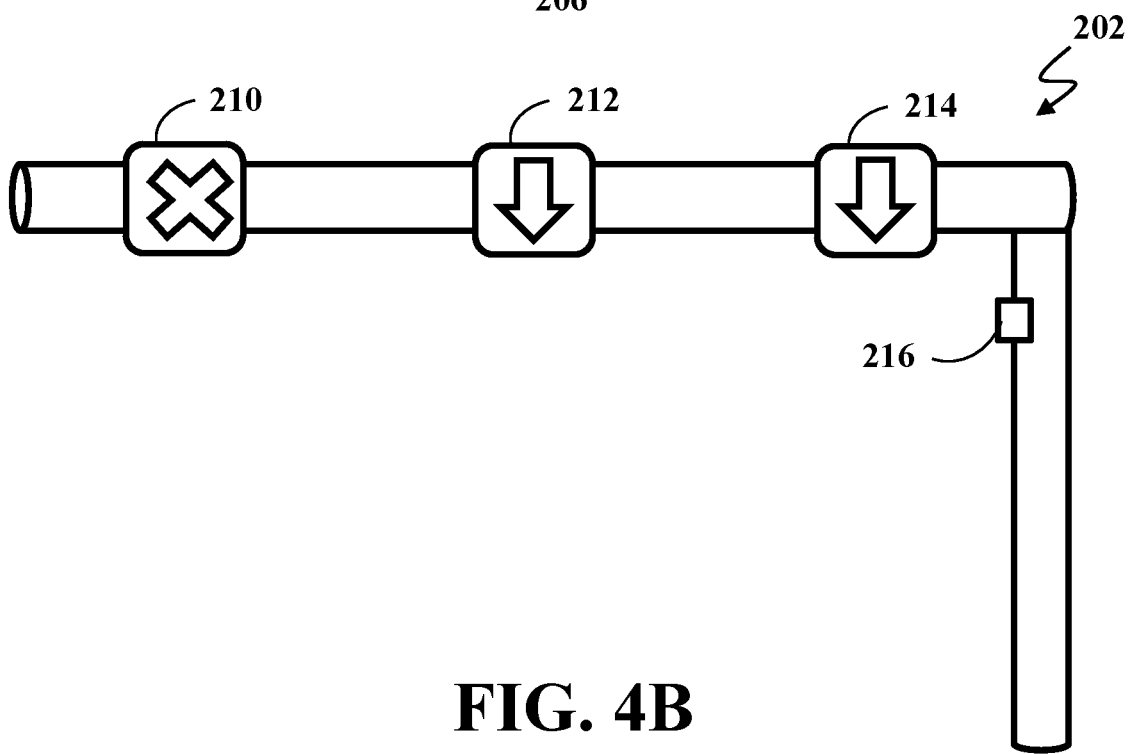
FIG. 4B is an exemplary set of dynamic lane use control signals (for northbound traffic) representing the center turn lane mode of the three-lane roadway of FIG. 4A.
Figure 4C:
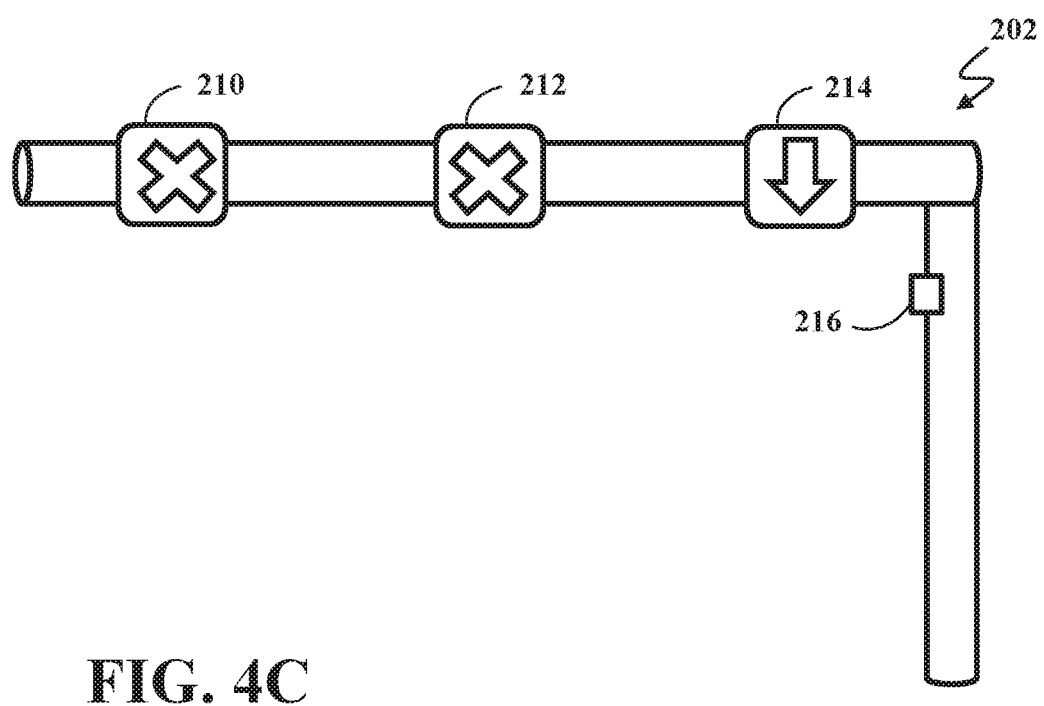
FIG. 4C is an exemplary set of dynamic lane use control signals (for southbound traffic) representing the center turn lane mode of the three-lane roadway of FIG. 4A.

FIG. 4A is a schematic illustration of an exemplary three-lane roadway 200 with a southbound lane 204, a reversible traffic lane 206 operable in a north-bound mode, and a northbound lane 208. FIG. 4B is an exemplary set of dynamic lane use control signals (for northbound traffic) representing the center turn lane mode of the three-lane roadway of FIG. 4A. FIG. 4C is an exemplary set of dynamic lane use control signals (for southbound traffic) representing the center turn lane mode of the three-lane roadway of FIG. 4A.

Figure 5A:
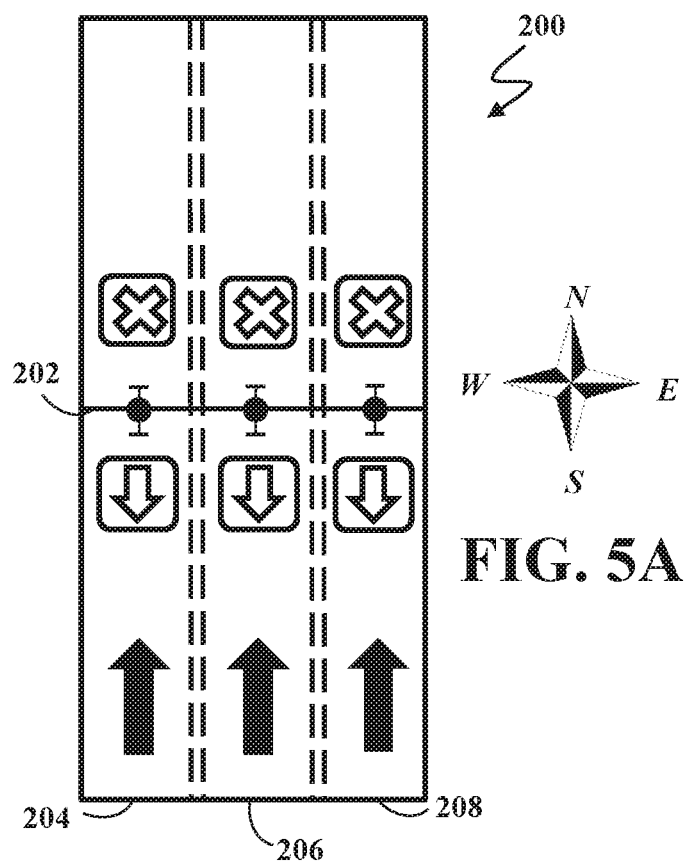
FIG. 5A is a schematic illustration of an exemplary three-lane roadway representing a one-way direction of traffic, with all traffic lanes being operable in a northbound mode only.
Figure 5B:
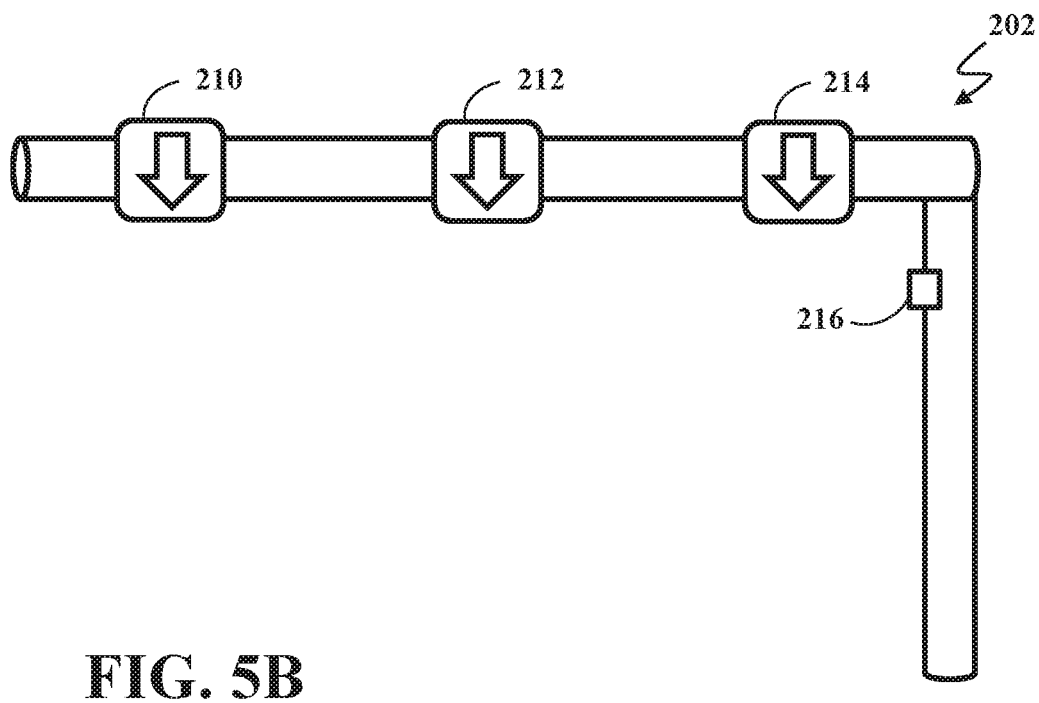
FIG. 5B is an exemplary set of dynamic lane use control signals (for northbound traffic) representing a one-way direction of traffic, with all three lanes of the three-lane roadway travelling in the same direction.
Figure 5C:
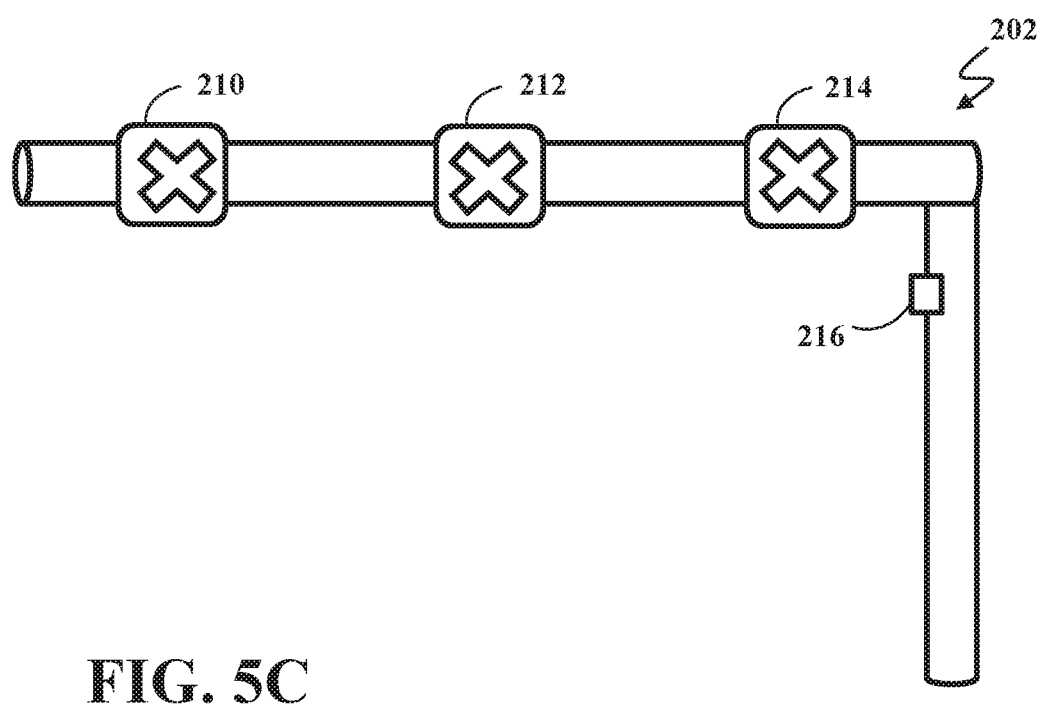
FIG. 5C is an exemplary set of dynamic lane use control signals (for southbound traffic) representing a closure of use of the roadway in the southbound direction.

FIG. 5A is a schematic illustration of an exemplary three-lane roadway 200 representing a one-way direction of traffic, with all traffic lanes 204, 206, 208 being operable in a northbound mode only. This may be useful in a weather related event, for example, during a hurricane evacuation, as well as with a special event, for example, after an event is ended, leading all cars out of a parking area. FIG. 5B is an exemplary set of dynamic lane use control signals (for northbound traffic) representing a one-way direction of traffic, with all three lanes of the three-lane roadway travelling in the same direction. FIG. 5C is an exemplary set of dynamic lane use control signals (for southbound traffic) representing a closure of use of the roadway in the southbound direction.

Figure 6A:
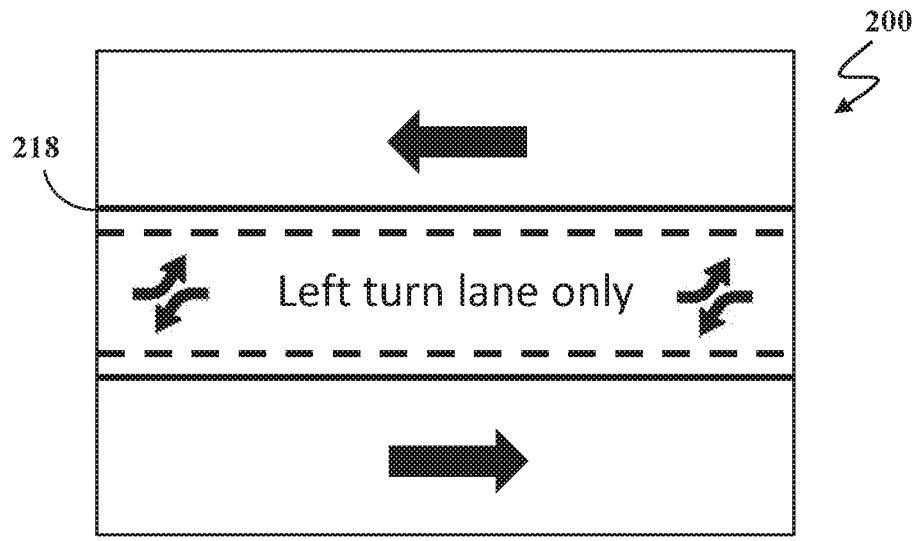
FIG. 6A is a schematic view of a three-lane roadway with a center lane having a pavement marking indicating it is for use with left turns only.
Figure 6B:
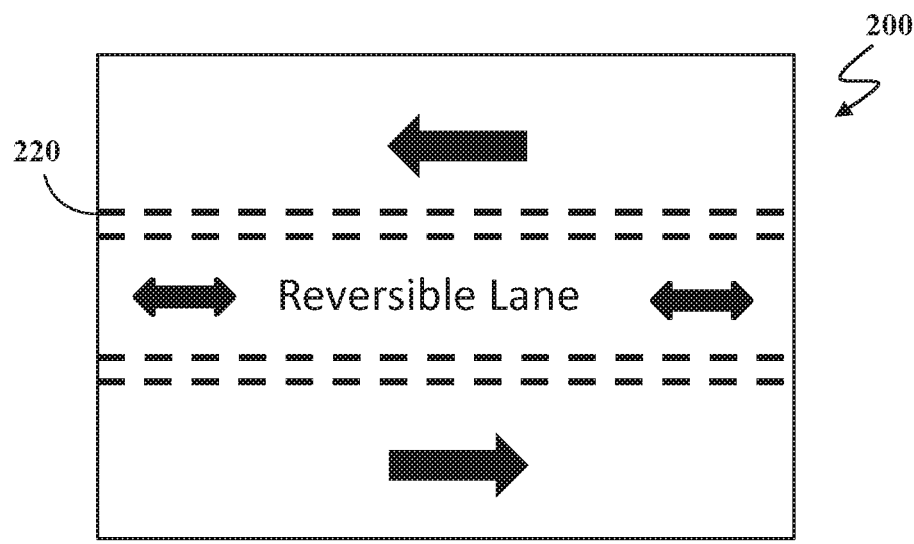
FIG. 6B is a schematic view of a three-lane roadway with a center lane having a pavement marking indicating it is a reversible traffic lane.
Figure 7A:
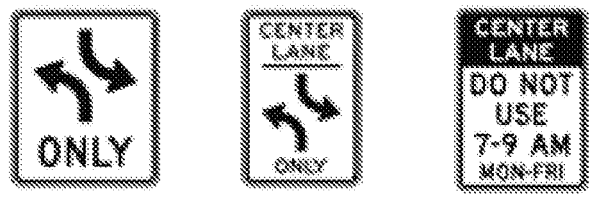
FIGS. 7A-7D illustrate various static signs that may be useful to explain the operations of a reversible traffic lane.
Figure 7B:
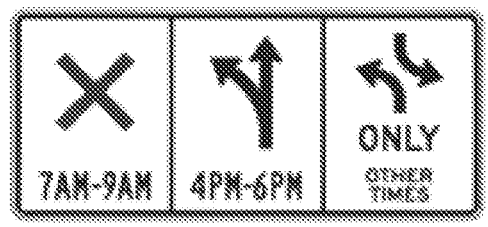
Figure 7C:
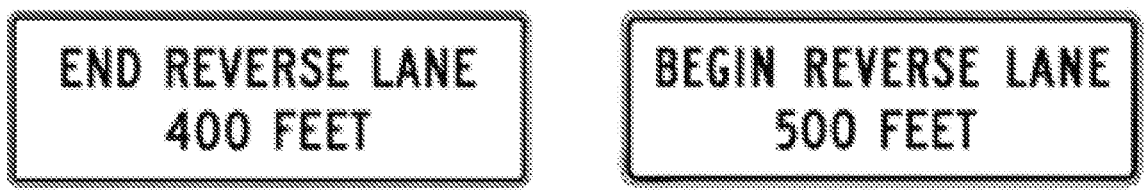
Figure 7D:
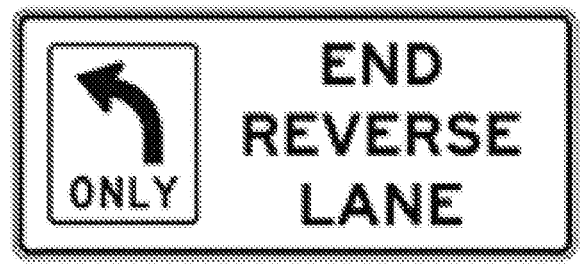

In transportation engineering design, roadway pavement markings and signs are generally directed by a governmental entity. For example, in the U.S., pavement markings are directed in a federal design document called the Manual on Uniform Traffic Control Devices. Within this manual are accepted practices for engineering design that are used throughout the United States. In 2009, this guidebook provided standard guidelines and details for the implementation of reversible traffic lanes. It should be understood that jurisdictions other than the United States may have alternate guidelines. The pavement markings must meet certain standards and these standards will be applied to the reversible traffic lane. FIG. 6A is a schematic view of a three-lane roadway 200 with a center lane having a pavement marking 218 indicating it is for use with left turns only. FIG. 6B is a schematic view of a three-lane roadway 200 with a center lane having a pavement marking 220 indicating it is a reversible traffic lane. The pavement markings 218, 220 may be detected using various onboard sensors, such as a camera, and can be used for verification purposes.

FIGS. 7A-7D illustrate various static signs that may be useful to explain the operations of a reversible traffic lane. Although these street signs are not electrical and will always show the same message, the present technology is also applicable with dynamic signs, or signs that change in content. These signs may be placed along a corridor of a road at specific locations to convey to the motorists information pertaining to the operations of the middle reversible traffic lane. In various aspects, as described above, these types of static signs can be used as a secondary resource for verification of the road rules.

Detailed aspects are disclosed herein. However, it is to be understood that the disclosed aspects are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various aspects are shown in FIGS. 1-7, but the aspects are not limited to the illustrated structure or application.

The flowcharts and block diagrams in the figures illustrate the architecture, functionality, and operation of possible implementations of systems, methods, and computer program products according to various aspects. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, aspects described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present aspects may be written in any combination of one or more programming languages, including an object-oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing description is provided for purposes of illustration and description and is in no way intended to limit the disclosure, its application, or uses. It is not intended to be exhaustive or to limit the disclosure. Individual elements or features of a particular aspect are generally not limited to that particular aspect, but, where applicable, are interchangeable and can be used in a selected aspect, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple aspects having stated features is not intended to exclude other aspects having additional features, or other aspects incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an aspect can or may comprise certain elements or features does not exclude other aspects of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an aspect or particular system is included in at least one aspect or embodiment. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method of updating a road map display of an autonomous vehicle with at least one change of a road rule, the method comprising:
    acquiring data, using one or more sensors or communication devices, indicative of at least one temporal change in the road rule for use in controlling a driving maneuver, wherein the temporal change in the road rule cannot accurately be programmed in the autonomous vehicle in advance;
    validating the data indicative of the temporal change in the road rule using at least one secondary resource, and confirming the temporal change in the road rule;
    determining a geographical location affected by the temporal change in the road rule;
    determining, based on at least one of a current location of the autonomous vehicle and a current route guidance plan, that the vehicle will traverse the geographical location affected by the temporal change in the road rule;
    sending a command to update the road map display of the autonomous vehicle to graphically illustrate the temporal change in the road rule;
    acquiring additional data, using the one or more sensors or communication devices, indicative of an end of the temporal change in the road rule and a reversion to a standard road rule; and
    sending a command to further update the road map display of the autonomous vehicle to graphically illustrate a reversion to a standard road rule.

2. The method according to claim 1, further comprising:
    determining a change in a driving maneuver permitted by the temporal change in the road rule; and
    causing the autonomous vehicle to implement the change in the driving maneuver.

3. The method according to claim 2, wherein the change in the driving maneuver comprises changing a travel lane to a reversible traffic lane.

4. The method according to claim 1, wherein the secondary resource comprises a camera sensor, and validating the data comprises detecting at least one of: a pavement marking, a dynamic lane use control signal, and a static sign confirming the temporal change in the road rule.

5. The method according to claim 1, wherein the secondary resource comprises a communication device, and validating the data comprises receiving verification information from at least one of: a government agency; a weather agency; and a neighboring vehicle confirming the temporal change in the road rule.

6. The method according to claim 1, wherein acquiring the data, using one or more sensors or communication devices, comprises receiving data broadcast from at least one of: a government agency; a weather agency; and an authorized third party.

7. The method according to claim 1, wherein the temporal change in the road rule relates to at least one of a parking rule and a reversible traffic lane changing a direction of travel.

8. The method according to claim 1, further comprising:
    providing at least one of a visual or audible notification to a user of the autonomous vehicle regarding an update to the road map display based on the temporal change in the road rule.

9. A method of operating an autonomous vehicle, the method comprising:
    acquiring data, using one or more sensors or communication devices, indicative of at least one temporal change in a road rule for use in controlling a driving maneuver, wherein the temporal change in the road rule cannot accurately be programmed in the autonomous vehicle in advance;
    validating the data indicative of the temporal change in the road rule using at least one secondary resource, and confirming the temporal change in the road rule;
    determining a geographical location affected by the temporal change in the road rule;
    determining, based on at least one of a current location of the autonomous vehicle and a current route guidance plan, that the autonomous vehicle will traverse the geographical location affected by the temporal change in the road rule;
    updating a standard road rule to an updated road rule based on the temporal change in the road rule;
    determining a change in a driving maneuver permitted for the autonomous vehicle based on the updated road rule; and
    causing the autonomous vehicle to implement the change in the driving maneuver.

10. The method according to claim 9, wherein acquiring the data, using the one or more sensors or communication devices, comprises receiving data broadcast from at least one of: a government agency; a weather agency; and an authorized third party.

11. The method according to claim 9, further comprising:
    acquiring additional data, using the one or more sensors or communication devices, indicative of an end of the temporal change in the road rule and a reversion to the standard road rule;
    determining a follow-up change in a driving maneuver required for the autonomous vehicle based on the reversion to the standard road rule; and
    causing the autonomous vehicle to implement the follow-up change in the driving maneuver.

12. The method according to claim 9, wherein causing the autonomous vehicle to implement the change in the driving maneuver comprises causing the autonomous vehicle to switch from a current travel lane to a reversible traffic lane.

13. The method according to claim 9, further comprising:
    sending a command to update a road map display of the autonomous vehicle to graphically illustrate the temporal change in the road rule.

14. A system for operating an autonomous vehicle based on at least one updated road rule, the system comprising:
    one or more sensors or communication devices, the one or more sensors or communication devices being configured to acquire data that may be indicative of at least one temporal change in a road rule; and a processor operatively connected to the one or more sensors or communication devices, the processor being configured to:
determine that the data acquired by the one or more sensors or communication devices is indicative of at least one temporal change in a road rule for use in controlling a driving maneuver, wherein the temporal change in the road rule cannot accurately be programmed in the autonomous vehicle in advance;
validate the data indicative of the temporal change in the road rule using at least one secondary resource in order to confirm the temporal change in the road rule;
update a standard road rule to an updated road rule based on the temporal change in the road rule;
determine a change in a driving maneuver permitted for the autonomous vehicle based on the updated road rule; and
cause the autonomous vehicle to implement the change in the driving maneuver.

15. The system according to claim 14, wherein the processor is further configured to:
detect a geographical location affected by the at least one temporal change in the road rule;
determine, based on at least one of a current location of the autonomous vehicle and a current route guidance plan, that the autonomous vehicle will traverse the geographical location affected by the at least one temporal change in the road rule; and
update the standard road rule responsive to determining that the autonomous vehicle will traverse the geographical location.

16. The system according to claim 14, wherein the processor is further configured to:
send a command to update a road map display of the autonomous vehicle to graphically illustrate the temporal change in the road rule.

* * * * *

UNITED STATES PATENT AND TRADEMARK OFFICE
CERTIFICATE OF CORRECTION

PATENT NO. : 11,138,879 B2  
APPLICATION NO. : 16/185628  
DATED : October 5, 2021  
INVENTOR(S) : Schuyler H. Cohen Page 1 of 1

It is certified that error appears in the above-identified patent and that said Letters Patent is hereby corrected as shown below:

In the Specification

Column 4, Line 25: delete "map. and" and insert --map, and--

In the Claims

Column 17, Claim 1, Line 31: delete "the vehicle" and insert --the autonomous vehicle--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*